United States Patent [19]

Kihara

[11] Patent Number: 4,835,594
[45] Date of Patent: May 30, 1989

[54] REGISTRATION ADJUSTING APPARATUS FOR A COLOR TELEVISION CAMERA USING A PLURALITY OF PICK-UP TUBES

[75] Inventor: Taku Kihara, Kanagawa, Japan

[73] Assignee: Sony Corporation, Tokyo, Japan

[21] Appl. No.: 184,598

[22] Filed: Apr. 21, 1988

[30] Foreign Application Priority Data

Apr. 22, 1987 [JP] Japan ................................. 62-099065
Apr. 28, 1987 [JP] Japan ................................. 62-105380

[51] Int. Cl.$^4$ ............................................. H04N 9/093
[52] U.S. Cl. ............................................. 358/51; 358/50
[58] Field of Search ................................... 358/51, 50

[56] References Cited

U.S. PATENT DOCUMENTS

4,318,124  3/1982  Nakamura .............................. 358/51
4,622,581  11/1986  Kihara et al. ........................... 358/81

*Primary Examiner*—James J. Groody
*Assistant Examiner*—Robert M. Bauer
*Attorney, Agent, or Firm*—Lewis H. Eslinger; Jay H. Maioli

[57] ABSTRACT

A registration adjusting apparatus for a color television camera having a plurality of image pick-up tubes in which an effective image area is divided into segmented image areas and the registration adjustment is effected for every one of the segmented image areas, changes the registration control data sequentially at predetermined intervals and calculates the registration error in every segmented image area over the entire image area from the values of the centering control data produced at the time points when the registration errors of the respective segmented image areas are inverted in polarity, thereby to reduce the time necessary for performing registration adjustment. The registration error data is produced using a test chart of vertical and horizontal stripes over the segmented image area and by interpolation or extrapolation, the registration error data at the centers of the respective segmented image areas can be obtained.

12 Claims, 9 Drawing Sheets

| $\frac{Cu_3-Cd_2}{2}$ (M$_{11}$) | $\frac{Cu_4-Cd_4}{2}$ (M$_{12}$) | $\frac{Cu_6-Cd_6}{2}$ (M$_{13}$) | $\frac{Cu_7-Cd_8}{2}$ (M$_{14}$) | $\frac{Cu_9-Cd_9}{2}$ (M$_{15}$) |
|---|---|---|---|---|
| $\frac{Cu_2-Cd_1}{2}$ (M$_{21}$) | $\frac{Cu_3-Cd_3}{2}$ (M$_{22}$) | $\frac{Cu_5-Cd_5}{2}$ (M$_0$) | $\frac{Cu_6-Cd_7}{2}$ (M$_{24}$) | $\frac{Cu_8-Cd_8}{2}$ (M$_{25}$) |
| $\frac{Cu_1-Cd_1}{2}$ (M$_{31}$) | $\frac{Cu_2-Cd_2}{2}$ (M$_{32}$) | $\frac{Cu_4-Cd_3}{2}$ (M$_{33}$) | $\frac{Cu_5-Cd_6}{2}$ (M$_{34}$) | $\frac{Cu_7-Cd_7}{2}$ (M$_{35}$) |

FIG. 12B

| M$_{11}$–M$_0$ | M$_{12}$–M$_0$ | M$_{13}$–M$_0$ | M$_{14}$–M$_0$ | M$_{15}$–M$_0$ |
|---|---|---|---|---|
| M$_{21}$–M$_0$ | M$_{22}$–M$_0$ | 0 | M$_{24}$–M$_0$ | M$_{25}$–M$_0$ |
| M$_{31}$–M$_0$ | M$_{32}$–M$_0$ | M$_{33}$–M$_0$ | M$_{34}$–M$_0$ | M$_{35}$–M$_0$ |

REGISTRATION ADJUSTING APPARATUS FOR A COLOR TELEVISION CAMERA USING A PLURALITY OF PICK-UP TUBES

BACKGROUND OF THE INVENTION

1. Field of the Invention

This invention relates generally to a method and apparatus for adjusting the registration in a color television camera having a plurality of color pick-up tubes and, more particularly, to a method and apparatus for performing registration adjustments by dividing the effective image area into a plurality of segmented image areas and adjusting registration at each segmented image area.

2. Description of the Background

In a multi-tube color television camera having a plurality of image pick-up devices, such as red, green, and blue pick-up tubes, extremely complex control systems are typically required in order to achieve registration of the images produced by the respective color image pick-up tubes. In general, one known approach is to correct the beam deflection currents so as to align the central positions of the output images of each of the respective image pick-up tubes. One previously proposed approach provides registration adjusting apparatus for a color television camera having three image pick-up tubes in which the picture screen is divided into a plurality of segmented image areas and a registration test chart is reproduced. In the proposed system, the registration adjustment is effected at each segmented image area in order to achieve uniform registration over the entire area of the screen, and such system is disclosed in U.S. Pat. No. 4,503,456 issued May 5, 1985 and assigned to the Assignee hereof.

Figure 1:
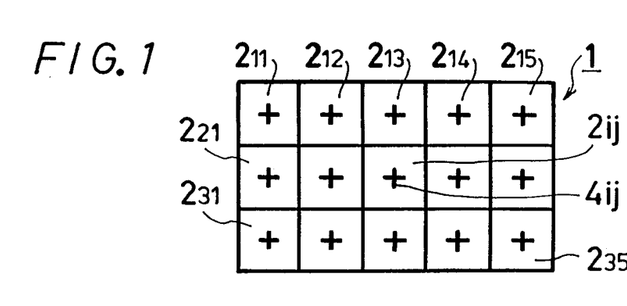
FIG. 1 is a representation of an image area divided into segments, for use in performing registration adjustments according to the present invention.

FIG. 1 is a representation of television screen that is useful in explaining the system that has been previously proposed. Generally, the effective image area of a color television camera is divided into an odd number of rows and an odd number of columns, for example, seven rows and seven columns, thereby providing forty-nine segmented image areas. Nevertheless, in order to more simply explain the previously proposed system, an effective image area 1 is shown in FIG. 1 consisting of three rows and five columns, thereby providing fifteen segmented image areas $2_{11}$ to $2_{15}$, $2_{21}$ to $2_{25}$, and $2_{31}$ to $2_{35}$. The registration test chart includes a cross mark "+" at the center of each segmented area that form a three-by-five matrix in the horizontal and vertical directions, respectively. The optical image $4_{ij}$ of a cross mark "+" is focused at the center of each segmented image area $2_{ij}$.

In the previously proposed system, it is generally the approach to perform registration of the red signal from the red image pick-up tube and the blue signal from the blue pick-up tube with reference to the green signal from the green pick-tube. Of course, it is understood that any one of the three colors could be originally chosen as the reference to which the other two colors are registered. Thus, for each segmented area of effective image area 1, the registration error data representing the registration errors in the vertical direction (V-errors) and registration errors in the horizontal direction (H-errors) of each of the red and blue image pick-up tubes are detected relative to the green image pick-up tube, which is used as the reference.

Generally, such registration error data is converted into digital data and stored temporarily in a corresponding location of a memory. Thus, in the instant example, such memory areas would have matrix addresses corresponding to the three rows and five columns of image area 1 in FIG. 1. Each memory area, thus defined, then stores the registration error data representing the H-error and V-error for a respective segmented image area. The data stored in the respective vertically adjacent elements of the memory area are then interpolated to obtain the error data for each scanning line using a digital approximation technique. A similar interpolation operation also takes place with the data stored in the memory areas that are adjacent each other in the horizontal direction, however, interpolation in that case may be performed as analog signal processing using a low-pass filter. Generally, the horizontal interpolation does not require digital signal processing techniques. Then, the registration compensating data that is stored in the memory areas is read out in synchronism with a scanning signal and is converted into an analog correction signal used to control the horizontal and vertical deflecting currents.

By use of this known technique, a correction of the image size of each image pick-up tube, the deflection linearity, the skew distortion, and pincushion distortion or the like may be simultaneously achieved over all of the segmented image areas during registration compensation.

Therefore, it is seen that by use of the above-described automatic technique the image registration adjusting operation for a color television camera having a plurality of image pick-up tubes is much simpler than the previously employed manual technique, in which each color is adjusted in registration by visually viewing the screen and making manual adjustments.

Figure 2:
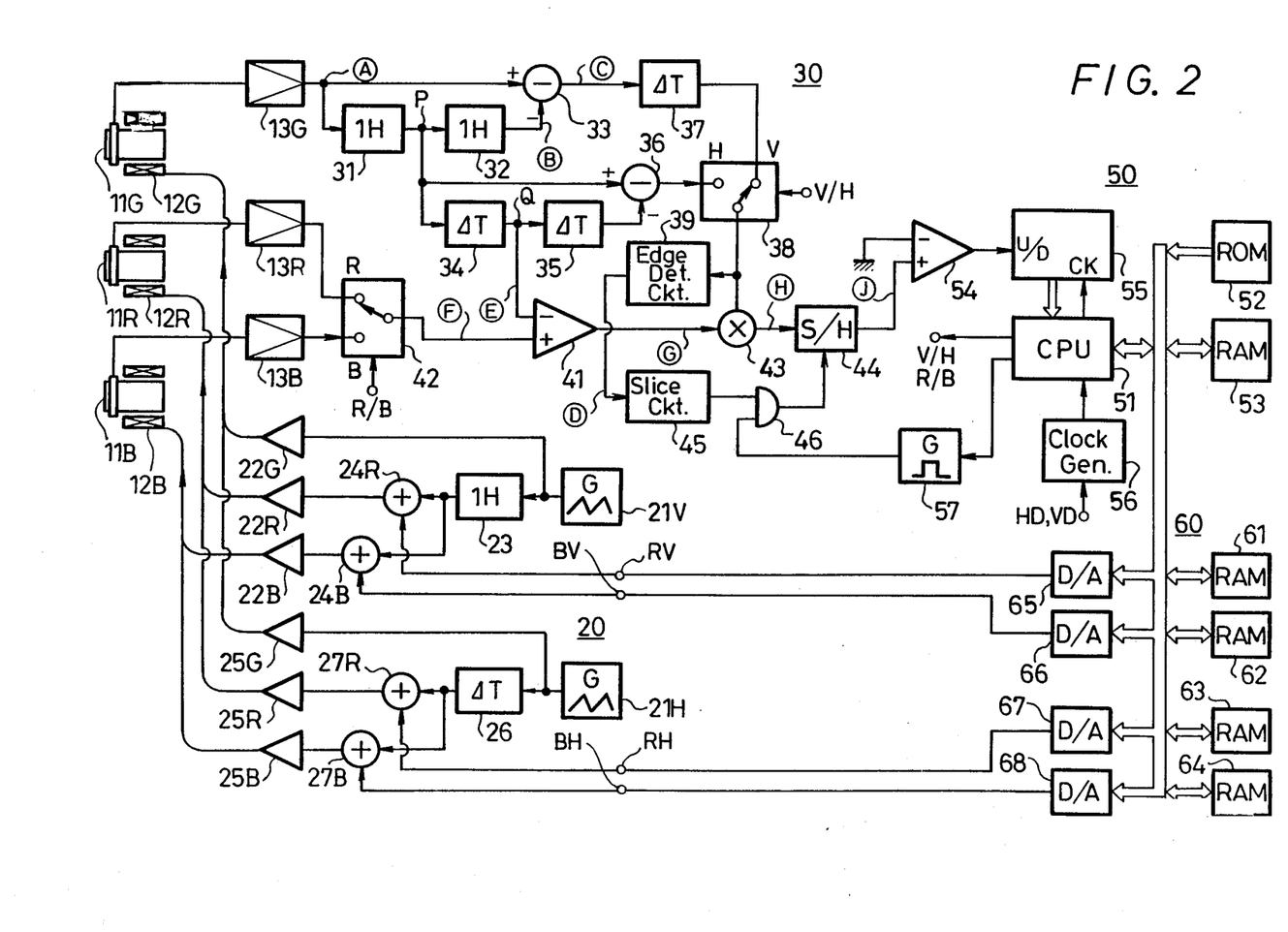
FIG. 2 is a schematic in block diagram form of a conventional registration adjusting system for use with a multi-tube color television camera.
Figures 3A, 3B:
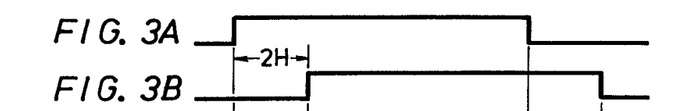
FIG. 3 represents signal waveforms present at respective points in the circuit of FIG. 2.
Figure 3C:
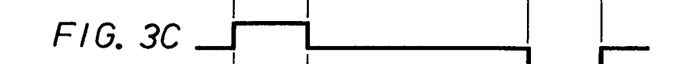
Figure 3D:
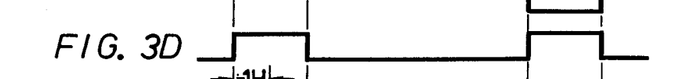
Figure 3E:
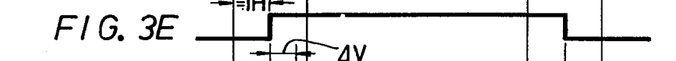
Figures 3F, 3G:
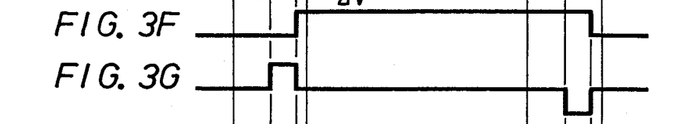
Figure 3H:
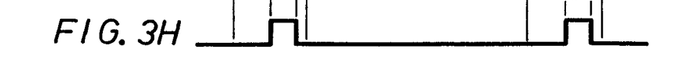
Figure 3J:
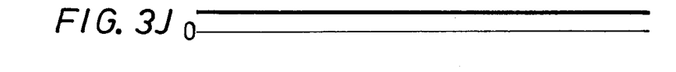

One example of a conventional registration adjusting system for a color television camera having a plurality of image pick-up tubes is shown in FIG. 2. In that system a television camera is provided with three image pick-up tubes 11G, 11R, and 11B that produce the green, red, and blue components of the color signal, respectively. Image pick-up tubes 11G, 11R, and 11B are provided, respectively, with deflection coils 12G, 12R, and 12B and the output video signals from such pick-up tubes are supplied to respective preamplifiers 13G, 13R, and 13B.

A deflection control circuit, shown generally at 20, includes horizontal and vertical sawtooth waveform generating circuits 21H and 21V. Vertical sawtooth waveform generating 21V circuit provides an output fed directly to a drive amplifier 22G, as well as outputs fed to drive amplifiers 22R and 22B through a one horizontal scan period (1H) delay line 23 and adders 24R and 24B. Similarly, horizontal sawtooth waveform generator 21H supplies an output directly to a drive amplifier 25G, as well as outputs to drive amplifiers 25R and 25B through a $\Delta T$ delay line 26 and adders 27R and 27B. The output from drive amplifiers 22G, 22R, and 22B and the outputs from the other corresponding amplifiers 25G, 25R, and 25B are fed directly to the corresponding deflection coils 12G, 12R, and 12B of the image pick-up tubes. Accordingly, in this approach the phase of the output signal from green image pick-up tube 11G is used as a reference to perform registration compensating and such phase is advanced relative to the phases of the output signals from the red and blue image pick-up tubes 11R and 11B by 1H in the vertical direction and by $\Delta T$ in the horizontal direction.

In producing the signals used for registration compensation, an edge signal generating circuit, sown generally at 30, is provided that has as one input the green image signal produced by green image pick-up tube 11G fed to amplifier 13G whose output is a signal represented at waveform A in FIG. 3. The output of amplifier 13G is fed through a pair of 1H delay lines 31 and 32, with the output of delay line 32 being fed to the minus input of a subtracting circuit 33, to which is input at the plus input the original, undelayed signal from amplifier 13G, so that subtracting circuit 33 produces a pulse having a width of 2H, as shown in waveform C of FIG. 3 that corresponds to the horizontal edge of the image. The signal at the junction point P between delay lines 31 and 32 is fed through a pair of $\Delta T$ delay lines 34 and 35 and is also fed directly to the plus input of a second subtracting circuit 36. Therefore, an output signal similar to the output from subtracting circuit 33 is produced by subtracting circuit 36, that is, an edge signal having a pulse width of $2\Delta T$ that corresponds, however, to the vertical edge of the image instead of the horizontal edge signal produced by subtracting circuit 35. In the present embodiment $2\Delta T$ equals approximately 300 nanoseconds.

The output signal from subtracting circuit 33 is fed through a $\Delta T$ delay line 37 to contact V (vertical) of a change-over switch 38. Similarly, the output from subtracting circuit 36 is fed to contact H of switch 38, so that the edge signals representing the horizontal and vertical edges of the image can be alternately selected using switch 38. This edge signal has a positive polarity at the leading edge of the video signal and a negative polarity at the trailing edge of the video signal. The edge signal is fed to an edge detector circuit 39 that generates a sampling pulse corresponding in time to the edge signal, and the sampling pulse is represented at waveform D in FIG. 3.

The signal at a junction Q between delay lines 34 and 35 is the output of amplifier 13G having been passed through delay lines 31 and 34 and, thus, is the output signal from amplifier 13G having been delayed by an amount $(1H+\Delta T)$ and is represented at waveform E in FIG. 3. The signal at junction Q is then fed to the negative input of a comparator circuit 41 whose other input, positive, is derived from a change-over switch 42 that has two inputs connected through amplifiers 13R and 13B to color image pick-up tubes 11R and 11B, respectively. It is these signals that contain the registration errors to be compensated using the green signal as the reference.

Thus, the output from comparator 41 is a position error signal representing the amount of registration error in the image produced by red or blue image pick-up tube 11R or 11B with respect to the reference image from green image pick-up tube 11G. This position error signal is then supplied to a multiplier 43 wherein it is multiplied by either the horizontal or vertical edge signal, waveform C of FIG. 3, which is the output of switch 38. Therefore, if switch 38 is in the position shown in FIG. 2 then the position error amount is given as $\Delta V$ and the output from multiplier 43 is a position error signal of magnitude $\Delta V$ relating to either the upper or lower registration error of the output image of the red or blue image pick-up tube 11R or 11B, depending upon the position of switch 42, with respect to the reference output image of green image pick-up tube 11G.

Similarly, when switch 38 is connected in the opposite state to that shown in FIG. 2, the output of multiplier 43 is a position error signal of magnitude $\Delta H$ with a direction of either the left-hand or right-hand side of the horizontal registration error of the output image from red or blue image pick-up tubes 11R or 11B relative to the reference output image of green image pick-up tube 11G.

The position error signal from multiplier 43, waveform H of FIG. 3, is fed to a sample-and-hold circuit 44, which samples and holds signal $\Delta H$ for the duration of a sampling pulse, represented at waveform D of FIG. 3, and produces a DC sample-and-hold voltage. The DC sample-and-hold voltage, the waveform of which is shown at J in FIG. 3, corresponds in level and polarity to the error signal output from multiplier 43. Sampling pulse D is supplied to sample-and-hold circuit 44 through a so-called slice circuit 45 to eliminate noise components and also through an AND gate 46. The opening and closing of AND gate 46 is controlled by a sampling gate pulse G fed thereto from a control circuit, shown generally at 50 through a pulse shaper 57. The sampling gate G pulse fed to AND gate 46 is generated by control circuit 50 in correspondence with each of the segmented image areas $2_{ij}$ of segmented image area 1 of FIG. 1.

Control circuit 50 includes a central processing unit (CPU) 51 that comprises a micro-computer and suitable memories, a read only memory (ROM) 52, and a random access memory (RAM) 53. RA 53 has the matrix addresses stored therein that correspond to the segmented image areas $2_{11}$ to $2_{35}$, as described herein-above, and also includes a memory area to store the interpolation data, also described herein-above. The output waveform of sample-and-hold circuit 44 is shown at waveform J at FIG. 3 and is fed to an input of comparator 54 wherein it is compared with a reference voltage, which in this case is ground potential or zero volts, to thereby detect the polarity of the registration error data, that is, up or down or left or right. The comparison output signal from comparator 54 will go to a high or low level depending upon the polarity of the registration error data and is fed to the up/down (UD) input terminal of an up/down counter 55. Counter 55 has the vertical sync signal $V_D$ supplied thereto at input CK as a clock pulse so that up/down counter 55 counts up or down in accordance with a high or low level, respectively, of the comparison output signal of comparator 54. The data from up/down counter 55 is supplied as input data to CPU 51. It should be noted that the functional equivalent of up/down counter 55 could be readily achieved using a microcomputer program in CPU 51. Furthermore, various operational programs for the interpolation, as well as programs for controlling the entire system, can also be a part of this microcomputer system by being written into ROM 52.

The horizontal drive signal HD and the vertical drive signal VD are supplied as trigger pulses to the clock signal generator 56, from which is derived clock pulses that are synchronized with the horizontal and vertical scanning operations of the image pick-up tubes 11G, 11R, and 11B. This clock pulse signal is then fed to CPU 51 that serves to actuate gate pulse generator 57 to produce the gate pulses G fed to AND gate 46. This gate pulse G is generated by gate pulse generator 57 to correspond with the center of each segmented image area $2_{ij}$ of image 1.

Thus, in response to the positions of switches 38 and 42, the registration error data represents whether the output image from red image pick-up tube 11R or blue image pick-up tube 11B is mis-directed in either the horizontal or vertical direction with respect to the reference output image from green image pick-up tube 11G. This data is then sequentially stored in CPU 51 at every segmented image area $2_{11}, 2_{12}, \ldots 2_{15}$ of the rows of image area 1 or at every segmented image area $2_{11}, 2_{21}$ and $2_{31}$ of the respective columns of image area 1. Therefore, a four-channel registration adjustment can be effected, such four channels comprising the red vertical (R/V), the blue vertical (B/V), the red horizontal (R/H), and the blue horizontal (B/H).

A demultiplexer, shown generally at 60, is provided for demultiplexing or reordering this four-channel registration data and such demultiplexer includes four memories 61, 62, 63, and 64 that are connected via a data bus to CPU 51. Accordingly, the stored registration compensation data are read out from memories 61, 62, 63, and 64 in synchronism with the scanning operations of the respective image pick-up tubes 11G, 11R, and 11B. Such stored registration compensation data is converted into analog signals by digital-to-analog converters (D/A) 65, 66, 67, and 68 and the suitably converted data is then fed to adder circuits 24R, 24B, 27R, and 27B, which form a portion of the deflection control circuit 20.

When the registration adjustment of a particular channel in the selected segmented image area $2_{ij}$ of the image area 1 commences, for example, if it is desired to perform registration adjustment in channel R/V, then the maximum compensation width W and an initial value $D_0$ are set in up/down counter 55 based upon the desired accuracy with which the respective image pick-tube 11G, 11R, and 11B are mounted in the color television camera. Because this system is a comparative control system no compensation data will be generated based on the initial value $D_0$.

Figure 4:
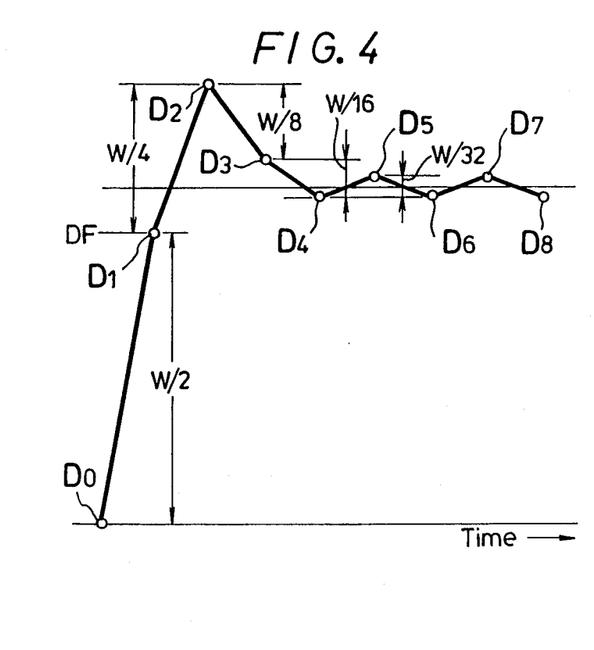
FIG. 4 is a graph useful in explaining the registration adjustment operation of the circuit of FIG. 2.

Assuming that the output from sample-and-hold circuit 44, as represented by waveform J in FIG. 3, has a positive polarity at a time when the first clock pulse is supplied to up/down counter 55, then the comparison output from comparator 55 will go to a high level so that the count value of the up/down counter 55 will be incremented from the initial value $D_0$ by an amount W/2 to a new value $D_1$. This action of the count value and up/down counter 55 is represented in FIG. 4, in which the ordinate axis represents the count value in counter 55 and the abscissa represents time, such time being based on the clock pulses fed to the counter. Therefore, it is seen that with a value W/2 in counter 55 digital-to-analog convertor 65 provides a compensation amount corresponding to this increased amount W/2 to adder 24R of deflection control circuit 20. Accordingly, the output from red drive amplifier 22R is increased and the position of the red image is moved in the direction to decrease the registration error of image pick-up tube 11R relative to green image pick-up tube 11G.

Now, sample-and-hold circuit 44 will again supply a registration error signal to comparator 54 representing the new position of this image based upon the change introduced by drive amplifier 22R. If the output from sample-and-hold circuit 44 has a positive polarity at the time when the second clock pulse is supplied to up/down counter 55, the output from comparator 54 will again be at a high level so that up/down counter 55 counts up from value $D_1$ to value $D_2$ by an amount W/4.

Then, D/A converter 65 supplies the compensation amount corresponding to the increased amount W/4 to adder 24R of deflection control circuit 20 and the red image is adjusted accordingly. Thus, it is seen that the content of the up/down counter 55 is incremented or decremented by the compensating width $W/2^m$ which is reduced at every compensation by one-half and, thus, the compensation signal is converged to the desired value, denoted as $D_F$. This compensating width function can be set in counter 55 by CPU 51, particularly when counter 51 is a software implementation in the microcomputer.

When the compensation width that is set or determined by the output of counter 55 reaches to within one bit of the limit of counter 55, that is, in this example W/32 as represented in FIG. 4, the content of counter 55 is incremented or decremented by one bit at every compensation point thereafter. However, if the increment or decrement by one bit is effected four times, for example, this repetition is detected by CPU 51 and is determined that the compensating data has been converged to the desired value $D_F$. Accordingly, the content $D_8$ of the up/down counter 55 at that time is stored at a predetermined address in RAM 53.

After the registration adjustment for one of the four channels has been completed for all of the segments of segmented image area 1, which might require for example 10 fields per column, the registration adjustment for the remaining three channels is then sequentially performed, with the result that the image pick-up tubes 11R and 11B will produce output images with no color mis-registration relative to the green image pick-up tube 11G.

In FIG. 1 image area 1 is divided into a large number of segmented image areas, and if the centering adjustment is first effected with respect to the central one of the segmented image areas, then the center of the output image of image pick-up tube 11G and the centers of the output images of the pick-up tubes 11R and 11B are in coincidence with each other and the registration adjustment for each of the segmented image areas is effected. Because the center areas are in coincidence, the compensation amounts for the respective other segmented image areas are substantially reduced.

An extremely fine registration adjustment can be performed using a similar procedure to obtain even better results by setting the minimum compensation width of the up/down counter 55 to a smaller value after completion of the above-described registration adjustment.

The previously proposed apparatus described hereinabove typically operates at a speed such that registration adjustment for one channel per column of the plurality of segmented image areas of the pick-up image area takes approximately 10 fields of the video signal. Thus, in a color television camera operating according to the NTSC system, in which the image area is divided into segmented image areas of seven rows and seven columns, one registration adjustment will require around 280 video fields or approximately 4.7 seconds. This time period, while seeming short, is a practical drawback in that it hinders rapid registration adjustment of the video camera.

The above unacceptable time is based on the NTSC color television camera, however, when a television camera operating according to the high definition television system (HDTV) is employed and registration compensation is performed, the number of segmented image areas will be increased typically to 13 rows and 13 columns. Accordingly, one registration adjustment will then take a time equivalent of 520 video fields or approximately 8.7 seconds. This time, of course, is entirely too long for rapid registration adjustment.

OBJECTS AND SUMMARY OF THE INVENTION

It is an object of the present invention to provide a method and apparatus for performing registration adjustments in a color television camera that can eliminate the above-noted defects inherent in the prior art.

Another object of this invention is to provide a registration adjusting method and apparatus for a multi-tube television camera that can reduce the time necessary for performing registration adjustments.

In accordance with an aspect of the present invention, a registration adjusting apparatus for a multi-tube color television camera in which the image area is divided into a plurality of segmented areas is provided. Registration errors of the plurality of image pick-up tubes in the respective segmented image areas are detected and at least one of the deflection circuits of the plurality of image pick-up tubes is controlled in response to the detected registration errors. A deflection control data generator produces deflection control data to control the deflection circuit and a polarity detecting circuit detects a change in polarity of the registration error for each segmented image area each time the deflection control data from the deflection control generator is changed in response to the detected area. A memory is provided that is arranged to have addresses corresponding to the segmented image areas and deflection control data is written into the memory at the time at which a change of polarity of the error signal is detected by the polarity detecting circuit. This polarity detecting circuit operates to detect changes in registration errors in all segmented image areas and to control the deflection control data accordingly in connection with a calculating circuit that calculates the registration error in each segmented image area from the corresponding deflection control data written in the appropriate address of the memory. Thus, the deflection circuit is controlled based on the output from this calculating circuit.

By sequentially changing the centering control data at predetermined times, the registration errors of the segmented image areas can be calculated by the centering control data each time the polarities of the registration errors at the respective segmented image areas of the image area are inverted, that is, each time the polarity changes, so that the time required for forming the registration of adjustment is substantially reduced.

The above and other objects, features, and advantages of the present invention will become apparent from the following detailed description of the preferred embodiment taken in conjunction with the accompanying drawings, in which like reference numerals designated like elements and parts.

DETAILED DESCRIPTION OF PREFERRED EMBODIMENTS

Figure 5:
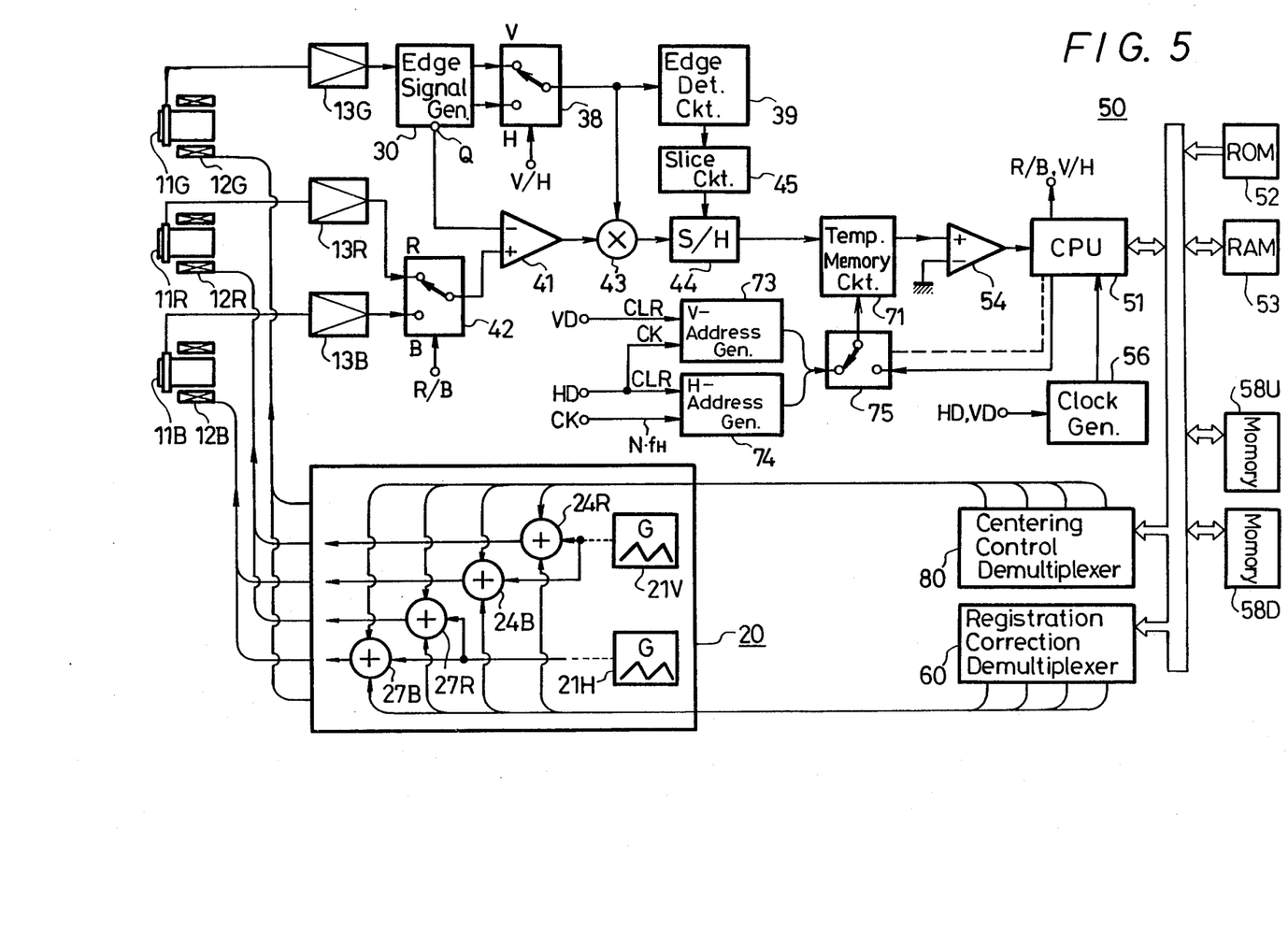
FIG. 5 is a schematic in block diagram form of an embodiment of the present invention.

In FIG. 5 the elements that are common to the known registration adjusting apparatus of FIG. 2 will not be described in detail and will be indicated with the same reference numerals as in FIG. 2. In this embodiment of the present invention, a temporary memory circuit 71 is provided with addresses corresponding to the respective segmented image areas $2_{11}$ and $2_{35}$ of image area 1 of FIG. 1. This temporary memory circuit 71 can comprise a latch circuit and digital-to-analog converter or the like and a description of the internal workings thereof is not necessary to the practice of the embodiment of FIG. 5. Temporary memory circuit 7 receives the actual registration error information from sample-and-hold device 44 through an adder 72 and the output from temporary memory circuit 71 is fed back through adder 72 to perform an integration function.

Two address generators 73 and 74 are connected to receive the vertical drive signal VD and the horizontal drive signal HD, respectively, at the clear input terminals thereof. The horizontal drive signal HD is also used as a clock signal by vertical address generator 73. Horizontal address generator 74 is connected to receive a clock signal having a frequency selected as $N.f_H$, where N for the HDTV system camera is greater than 2,000, for example. Thus, for the HDTV system, the clock frequency of horizontal address generator 74 is approximately 70 MHz. Although edge signal generator 30 is not shown in detail in FIG. 5, it is identical to that shown in FIG. 2 and in the HDTV system the delay time in the ΔT delay lines 34, 35, and 37, which form the edge signal, will be approximately 55 nanoseconds. Selector switch 75 receives the output addresses from vertical and horizontal address generators 73, 74 at one input and receives an address signal from central processing unit 51 that is a portion of control circuit 50. Switch 75 then selects between the two inputs under control of the central processing unit and feeds the selected address to temporary memory circuit 71. The output of temporary memory circuit 71 is then fed to one input of comparator 54, the other input of which is grounded as a reference and the output of comparator 54, which will either have a high or low level, is fed to CPU 51.

Two memories 58U (up) and 58D (down) are operably connected to CPU 51 and RAM 53 and are arranged to have address memory storage areas that correspond to the segmented image areas $2_{11}$ to $2_{35}$ of image area 1 of FIG. 1, similar to RAM 53 as described herein-above. As will be described below the values at particular time points of the centering control data derived from CPU 51 are stored in respective addresses of memories 58U and 58D, respectively. A demultiplexer 80 is provided to separate the centering control data into the desired four channel values, which are essentially DC signals, and, as above, such four channels are represented by R/V, B/V, R/H, and B/H and are based upon the centering control data from CPU 51. This four channel information is fed to the corresponding adders 24R, 24B, 27R, 27B in deflection circuit 20, as in the apparatus of FIG. 2. The registration correction demultiplexer 60 used in the registration adjustment apparatus of FIG. 2 is also provided in the embodiment of the present invention shown in FIG. 5 and include all the RAMs and D/As of the earlier system.

Figure 6:
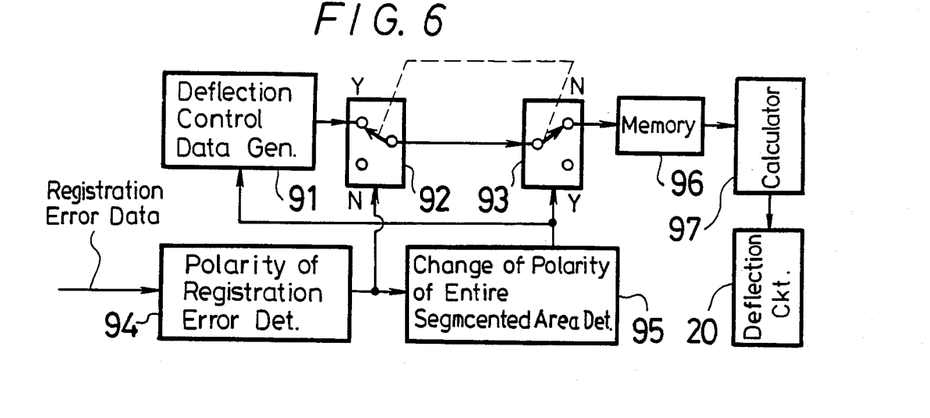
FIG. 6 is a block diagram of the principle teachings of the registration adjusting operation for a multi-tube color television camera, according to the present invention.

The principal functional blocks of the present invention found in the embodiment of FIG. 5 are shown in a more general nature in the block diagram of FIG. 6, in which a deflection control data generator 91 produces an output fed to a Y-contact of changeover switch 92. The output of switch 92 from the moveable contact thereof is fed to a corresponding moveable contact of a second changeover switch 93. The moveable contacts of changeover switches 92 and 93 are connected to operate together as represented by the dashed line connecting the respective moveable contacts. A registration error polarity detecting circuit 94 receives the registration error data, as might be produced, for example, by sample-and-hold circuit 44 of FIGS. 2 and 5, and is connected to a circuit 95 that detects all of the segmented image area polarity changes. The output of the polarity change detecting circuit 95 is also connected to changeover switch 92 as the control signal therefor. The output from segmented image area polarity change detecting circuit 95 is supplied to deflection control data generator circuit 91 and also as the control input to changeover switch 93. The output at the contact of changeover switch 93 is stored in a memory 96 and the output from memory 96 is fed to a calculating circuit 97. Memory 96 is the more general representation of up-/down memories 58U and 58D of the embodiment of FIG. 5. Accordingly, the output from calculating circuit 97 is then fed to deflection control circuit 20, shown in detail in FIGS. 2 and 5. The notations applied to the switch contacts indicate status of the data being fed therethrough. More specifically, the Y side of switch 92 means that the movable contact selects that contact when the polarity of the registration error changes and the N side mans the opposite condition because the control data generated by block 91 must be supplied to memory 96 (58U, 58D) if the polarity changes. Similarly, the N side of the switch 93 means that the movable contact is turned to the N side if the polarities of all of the segmented image areas has not changed and is turned to the Y side when all have changed polarities.

Figure 7:
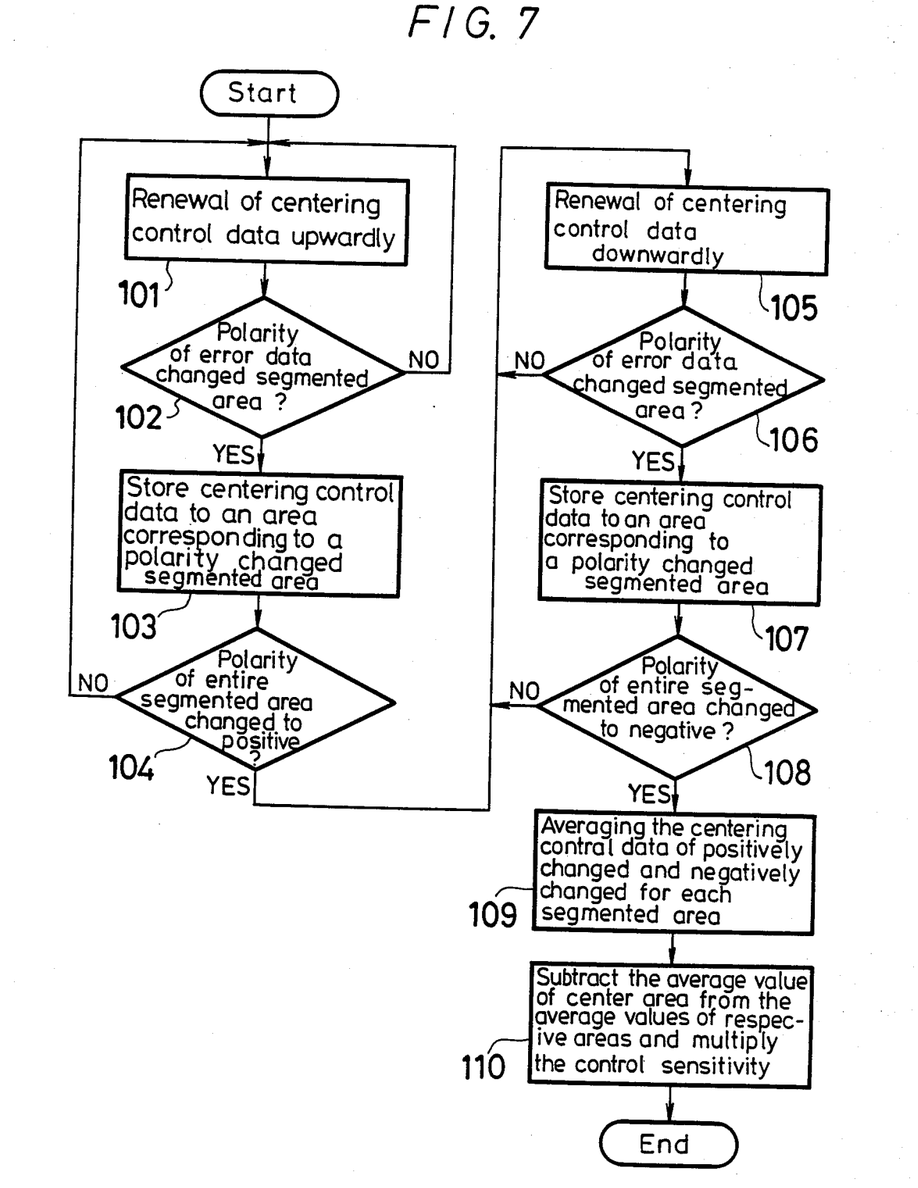
FIG. 7 is a flow chart showing the operation of the present invention represented in FIG. 6.
Figure 8:
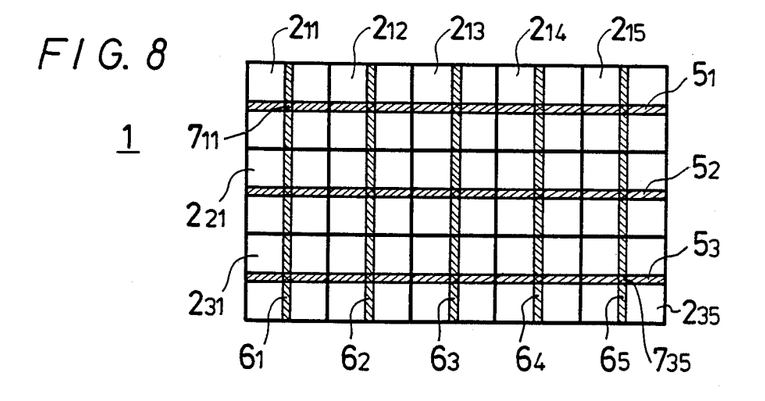
FIG. 8 is a representation of a segmented image area having a target pattern formed thereon.

The block diagram of FIG. 6 is intended to show in a system embodiment the functioning of the present invention, as represented by the flow chart of FIG. 7. In the following description of the operation of the inventive system, it is assumed that the effective image area is divided into segmented image areas $2_{11}$ to $2_{35}$ that form a three-by-five matrix, as shown in FIG. 1, for example. Note that as in the systems described in relation to FIG. 2 herein-above, the matrix is actually a seven-by-seven matrix. The registration test chart provided in accordance with the present invention is shown in FIG. 8 formed of cross-stripes comprising three horizontal stripes $5_1$, $5_2$, and $5_3$ and five vertical stripes $6_1$ through $6_5$.

As can be determined from FIG. 6, adder 72, temporary memory 71, and switch 75 are not absolutely necessary for achieving the desired operation of the present invention. The output signals from address generators 73 and 74 can be fed directly to CPU 51 in order for that unit to recognize which segment to the output of comparator 52 belongs. Because the output of comparator 54 is synchronized with the outputs of address generators 73 and 74, CPU 51 can detect the address of the segment at which the polarity of the error data changes. Practically speaking, however, the operating speed of the typical central processing unit is not as high as the scanning speed of the camera so that there is the real possibility that the CPU may misdetect the polarity change of a segment. Because of this difference in operating speeds between the CPU and the registration error production circuit, temporary memory 71 and switch 75 are generally desirable. When using a memory, the error data is stored in the memory in real time, that is, at a high speed, and then the CPU can read the data out of the memory more slowly by generating the appropriate address signals fed back to the memory.

In this embodiment, address generators 73 and 74 count clock signals ($Nf_H$) in synchronism with the vertical and horizontal scans to thereby produce positional information or data based on the vertical and horizontal directions relative to the dot on the picture screen of image pick-up tube 11G being scanned by the electron beam.

In a first field, during the period in which the electron beam scans the horizontal stripe $5_i$ in one segmented image area $2_{ij}$ of image area 1, the vertical registration error signal from sample-and-hold circuit 44 and the output produced by temporary memory circuit 71 at each clock signal of frequency $Nf_H$ are added by adder 72 and the added result written back into temporary memory circuit 71. This is simply an integration operation. Similarly, during the time in which the electron beam scans vertical stripe $6_j$ at an arbitrary segmented image area $2_{ij}$ of image area 1, the horizontal registration error signal from sample-and-hold circuit 44 and the output from temporary memory circuit 71 at each scan line are added by adder 72, with the summation again being written back into temporary memory circuit 71.

Thus, when the scanning operation of the first field has ended, the error data or integrated values of the registration errors of the corresponding segmented image areas $2_{11}$ to $2_{35}$ are stored at respective addresses in temporary memory circuit 71. The registration error data of the respective segmented image areas that are stored in temporary memory 71 contain the centering error components of image pick-up tubes 11R and 11B. Accordingly, the DC centering error components over all of the image areas and the AC registration error components particular to the respective segmented image areas of the image area are calculated as follows.

The polarity of each of the registration error data points corresponding to the segmented image areas $2_{11}$ to $2_{35}$ of image area 1 is detected at every one of the four channels R/V, B/V, R/H, B/H channels by comparator 54 and then latched into CPU 51.

Figure 9:
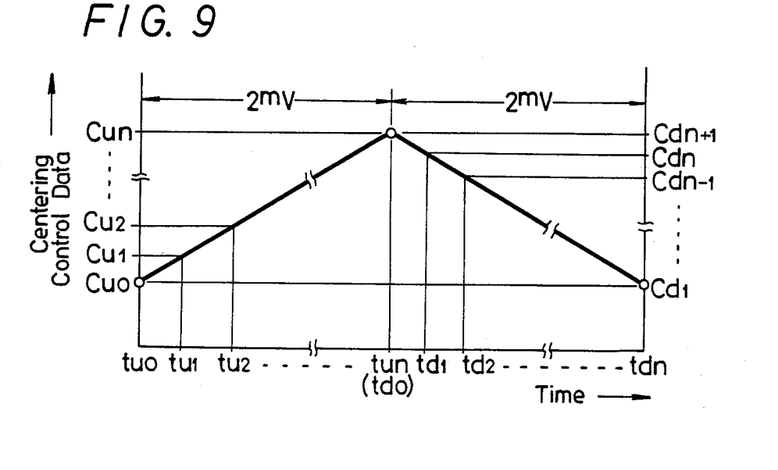
FIG. 9 is a graphical representation of the variance in the registration centering data produced according to the embodiment of FIG. 5.
Figure 10A:
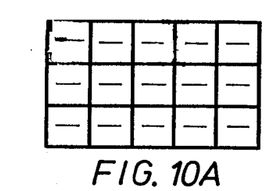
FIGS. 10A–10H are pictorial representations of the segmented image areas showing the changes in polarity that are produced as the registration adjustments are performed by the circuit of FIG. 5.
Figure 10B:
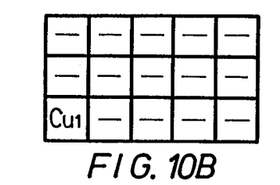
Figure 10C:
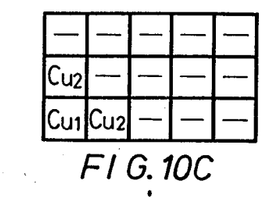

As represented in FIG. 9, at the adjustment starting point $t_{u0}$ of one arbitrary channel, for example, channel R/V, deflection control data generator 91, shown for example in the general diagram of FIG. 6, that is a part of CPU 51 generates an initial value $C_{u0}$ of centering control data. Initial value $C_{u0}$ of the centering control data is then converted into a DC current by centering control demultiplexer 80 and fed to adder 24R of deflection circuit 20. Thus, the entire image obtained by red image pick-up tube 11R can be moved, for example, downwardly, by a distance corresponding to the initial value $C_{u0}$ of the centering control data. As the output image is moved accordingly, the polarity of the error data of each segmented image area stored in temporary memory circuit 71 is such that will cause an increase in the control data at each segmented image area. At such time, no data is written in any of the areas of the memory, represented at 96 of FIG. 6. This condition in which no data is being written is pictorially represented in FIG. 10A.

Figure 11A:
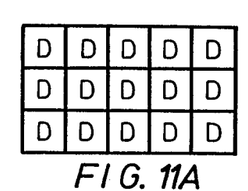
FIGS. 11A–11H are pictorial representations of the segmented image areas showing the correction data located therein.
Figure 11B:
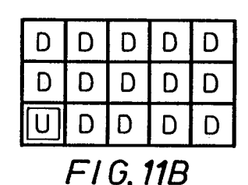

When actual registration adjustment begins, the centering control data is updated in an increasing direction at every field on a bit-by-bit basis, as represented at step 101 in the process flow chart of FIG. 7. At such time, the polarity detecting circuit 94 of FIG. 6 decides whether there is a segmented image area in which the polarity of the error information stored in temporary memory circuit 71 is inverted, thereby to decrease the control data in response to the most recent control data. The polarity inversion may be thought as being either in the up direction (U) or the down direction (D). This checking of the error data to determine whether it changes polarity in a segmented area is represented at step 102 of FIG. 7. If the determination in step 102 is that there is no segmented image area in which a positive inversion appears, that is, a change from direction D to direction U, the centering control data is then continuously updated. At the time point $t_{u1}$ in FIG. 9, where the value of the centering control data reaches $C_{u1}$, if the polarity of the error information on segmented image area $2_{31}$, represented by the framed segment in FIG. 11B, is inverted positively, changeover switch 92 is controlled to be temporarily connected in the state as illustrated in FIG. 6 by the detected output from polarity detector circuit 94. At such time, changeover switch 93 is then connected in the illustrated state and the value $C_{u1}$ of centering control data from data generating circuit 91 is stored in memory 96 at the memory area corresponding to segmented image area $2_{31}$, which storing operation is represented in step 103 of FIG. 7.

Figure 11C:
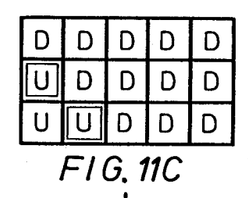

The updating of the centering control data is continued and at time $t_{u2}$ where the value reaches $C_{u2}$, as represented in FIG. 9, if the polarities of the error data at the segmented image areas $2_{21}$ and $2_{32}$ denoted by the framed segments in FIG. 11C are positively inverted as described above, the value $C_{u2}$ of the centering control data from data generating circuit 91 is stored in memory 96 at the memory areas corresponding to the segmented image areas $2_{21}$ and $2_{32}$, as represented in FIG. 11C.

Figure 10D:
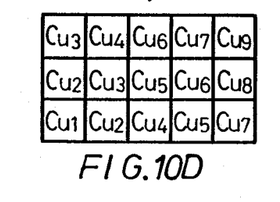
Figure 10E:
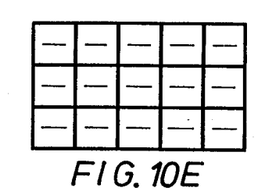
Figure 10F:
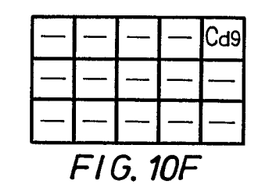
Figure 10G:
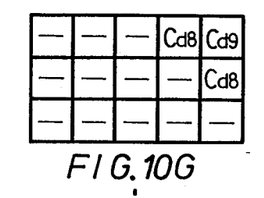
Figure 10H:
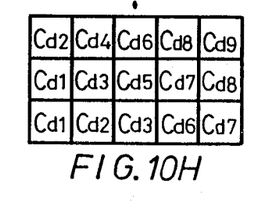

As the centering control data is then updated, the segmented image area polarity detecting circuit decides whether the polarities of the error data of all of the segmented image areas of the image area are positively inverted, as represented by the determination of step 104 of FIG. 7. At some point in time, $t_{un}$ after $2^m$ fields have elapsed, for example, 32 fields from the adjusting starting point $t_{u0}$, the value of the centering control data reaches $C_{un}$, as represented at the apex of the graph of FIG. 9. If the polarities of the error data over all of the segmented image areas $2_{11}$ to $2_{35}$ are positively inverted, under control of the detected output from the entire segmented image area polarities detecting circuit 95, the values $C_{u1}$ to $C_{un}$ of the centering control data from deflection control data generating circuit 91 are stored in memory 96 over all of the memory areas corresponding to segmented image areas $2_{11}$ to $2_{35}$, as represented at FIG. 10D. Thereafter, the renewal of the data from deflection control data generating circuit 91 ceases and changeover switch 93 is connected in the opposite direction than shown in FIG. 6.

Therefore, it is seen that the value $C_{u5}$ of FIG. 10D of the deflection control data in the central segmented image area $2_{23}$ of image area 1 is actually the centering error component itself. Furthermore, because the registration control sensitivity and the centering control sensitivity are different relative to a change of one bit in the deflection control data, the difference resulting from reducing the value $C_{u5}$ of the control data at the central segmented image area from the values of the control data of other segmented image areas is multiplied by the control sensitivity ratio in order to produce the registration error component for each segmented image area. This control sensitivity ratio is then made constant over the entire image area for every color television camera.

Thus, according to this embodiment, the registration adjustment over the entire image area is stopped after 32 fields per channel and, compared with the conventional apparatus, the registration adjusting time can be reduced substantially by one-half to one-fourth for the NTSC system color television camera and the HDTV system color television camera.

As described above, it is possible to provide even a finer adjustment of the registration accuracy and to accomplish that the following procedure is carried out. As represented in FIG. 9, if time point $t_{un}$ at which the centering control data is updated in the so-called upward direction and the polarities of the error data in the entire segmented image areas of the image area are changed in the upward direction is taken as time point $t_{d0}$ at which the registration readjustment is started, then from this time point $t_{d0}$ the control data within the deflection control data generating circuit 91 of FIG. 6, formed within CPU 51, will be updated in the downward direction, as represented at step 105 in FIG. 7.

Figure 11D:
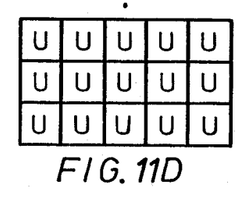
Figure 11E:
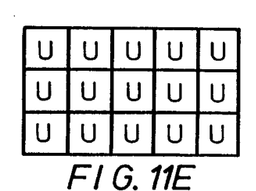
Figure 11F:
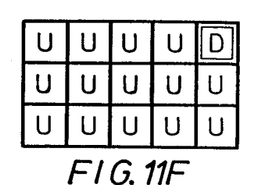
Figure 11G:
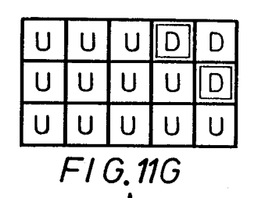
Figure 11H:
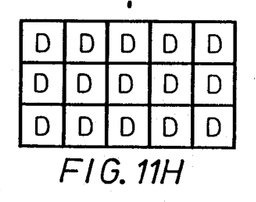

Thus, operations very similar to steps 102 through 104 are effected once again at steps 106 through 108 and, at time point $t_{dn}$ after 32 fields from the adjustment starting point $t_{d0}$, the polarities of the error information of the entire segmented image areas of the image area are inverted to the downward direction, as represented in FIG. 11H. At time point $t_{dn}$ the centering control data value $C_{dn}$ to $C_{d1}$, which are produced at the time the polarities of the error data in the segmented image areas $2_{11}$ to $2_{35}$ of the image area are inverted, are stored in the respective memory areas of memory 58D of FIG. 5. The centering control data $C_{u1}$ to $C_{un}$ in the upward direction, as represented in FIG. 11D are stored in memory 58U of the circuit of FIG. 5.

Figure 12A:
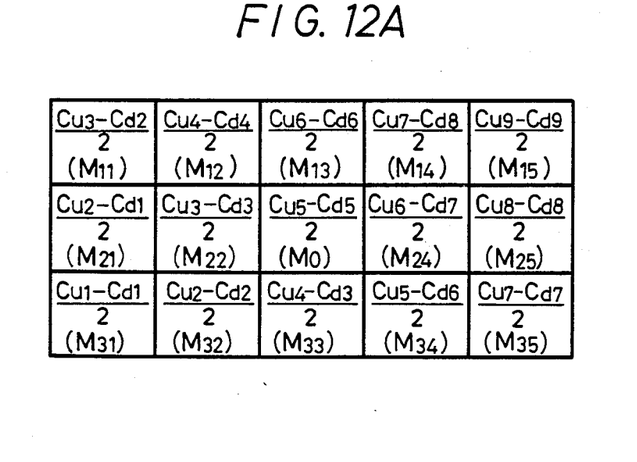
FIGS. 12A and 12B are pictorial representations of segmented images areas showing the registration correction adjustments made according to the circuit of FIG. 5.
Figure 12B:
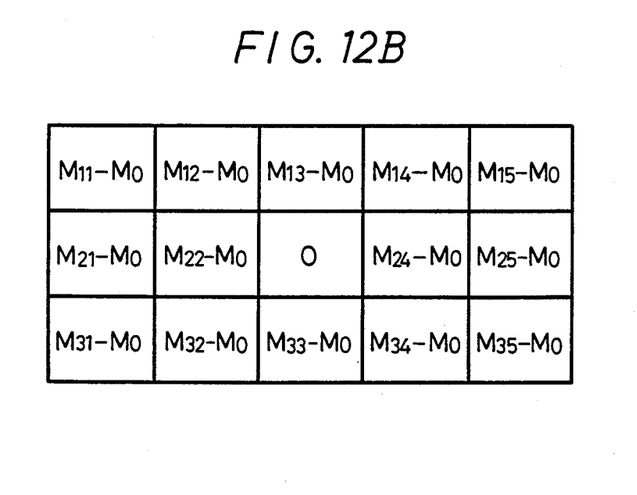

Turning now to FIG. 12A, the control data value of the segmented image areas corresponding to both memories 58U and 58D of FIG. 5, which are averaged in step 109 of the method of FIG. 7, are represented. As described herein-above, the mean value $M_0$ represented as the center value of FIG. 12A of the control data on the segmented image area $2_{23}$ is the centering error component. Then, as shown in FIG. 12B, each of the mean values $M_{11}$ to $M_{35}$ of the control data of the other segmented image areas has this mean value subtracted therefrom and the difference $(M_{ij}-M_0)$ of the arbitrary segmented image area $2_{ij}$ is multiplied by the control sensitivity ratio, which is derived at step 10 of FIG. 110 of the process of FIG. 7, thereby producing the registration error component of that arbitrary segmented image area. On the basis of the calculated registration error component then, the registration adjustment can be effected by the above-mentioned procedure at each of the four channels R/V, B/V, R/H, and B/H. By using the averaging process the accuracy of the registration adjustment is the same as that in the case where the centering control data is increased by one bit. Furthermore, in the HDTV system color television camera, even in spite of the averaging process, the registration adjustment time can be reduced by one-half when compared with the apparatus of FIG. 2, for example.

Accordingly, because the centering control data is sequentially changed at each predetermined time interval and the registration errors of the respective segmented image area are calculated from the centering control data values produced at the time at which the polarities of the registration errors of the respective areas are inverted, it is possible to provide a registration adjustment apparatus for a multi-tube registration camera that can reduce the time usually required for the registration adjustment.

Figure 13:
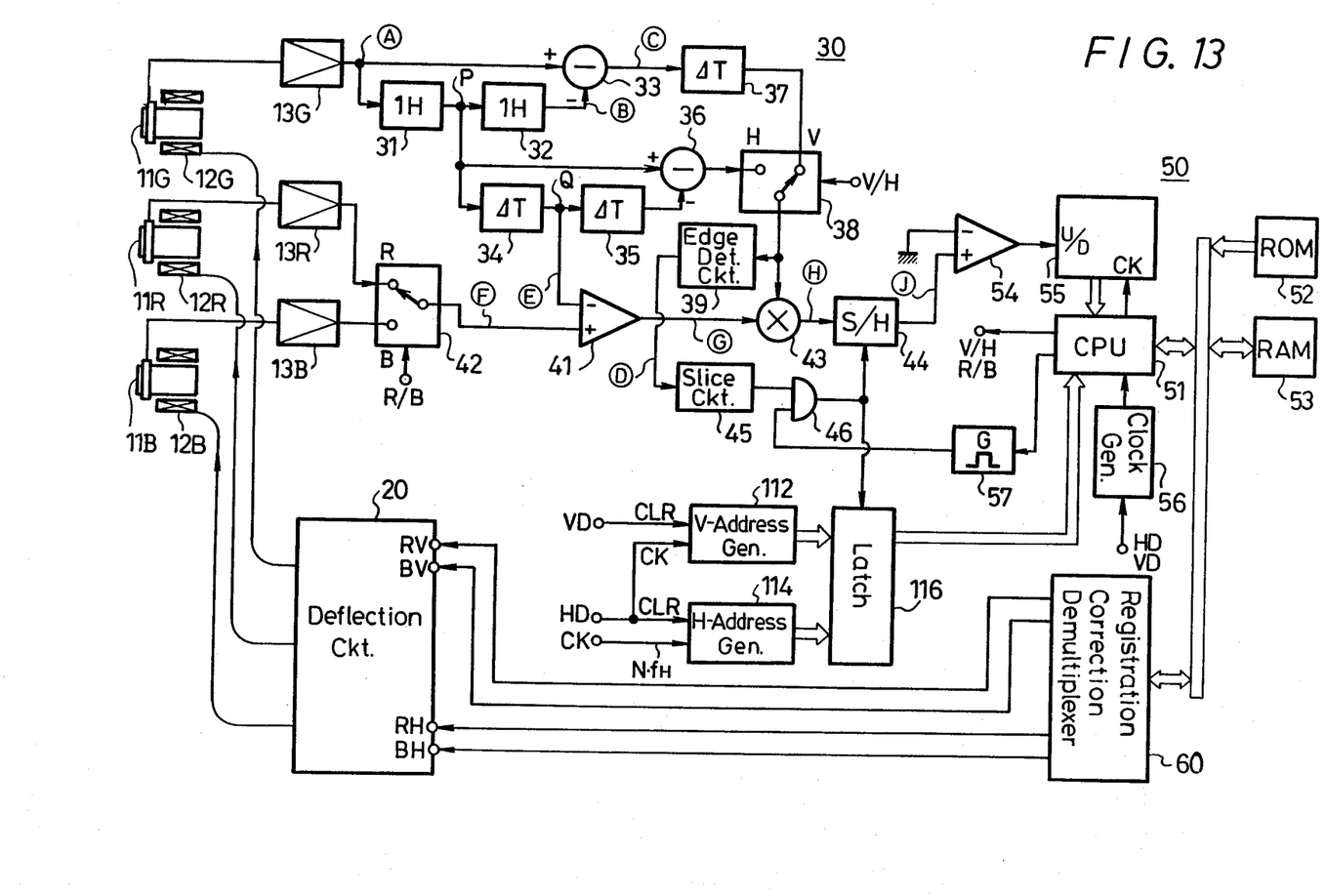
FIG. 13 is a schematic in block diagram form of another embodiment of a registration adjusting apparatus according to the present invention.

Another embodiment of a registration adjustment system according to the present invention is shown in FIG. 13. In FIG. 13, the elements corresponding to those of FIG. 2 are identified with the same reference numerals and a detailed explanation thereof is omitted. Referring now to FIG. 13, address generators 112 and 114 receive at their respective clear terminals CLR the vertical drive signal VD and the horizontal drive signal HD, respectively. The horizontal drive signal HD is fed to the address counter 112 as a clock signal and the clock signal for address generator 114 is a signal of frequency $NF_H$. As described above, in the HDTV system color television camera N is greater than 2,000 and the clock frequency for address generator 114 is approximately 70 MHz. Once again, in such system, delay times $\Delta T$ of the respective delay lines 34, 35, and 37 that generate the edge signal is selected to be around 55 nanoseconds.

A latch circuit 116 receives outputs from address generators 112 and 114 as well as an output signal D from edge detector 39 after having been passed through slice circuit 45 and AND gate 46. This same signal D is fed to gate sample-and-hold circuit 44. The output from latch circuit 116 is fed through an input/output port (not shown) to CPU 51 that is part of control circuit 50. When compared with the embodiment of FIG. 2, it is seen that the remainder of the apparatus of FIG. 13 is substantially identical.

Figure 14:
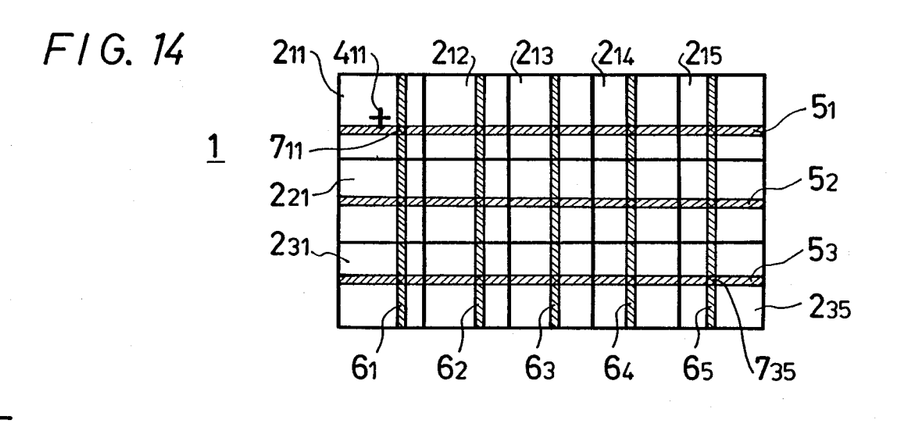
FIG. 14 is a pictorial representation of a segmented image area showing a target arranged thereon for use with the circuit of FIG. 13.
Figure 15:
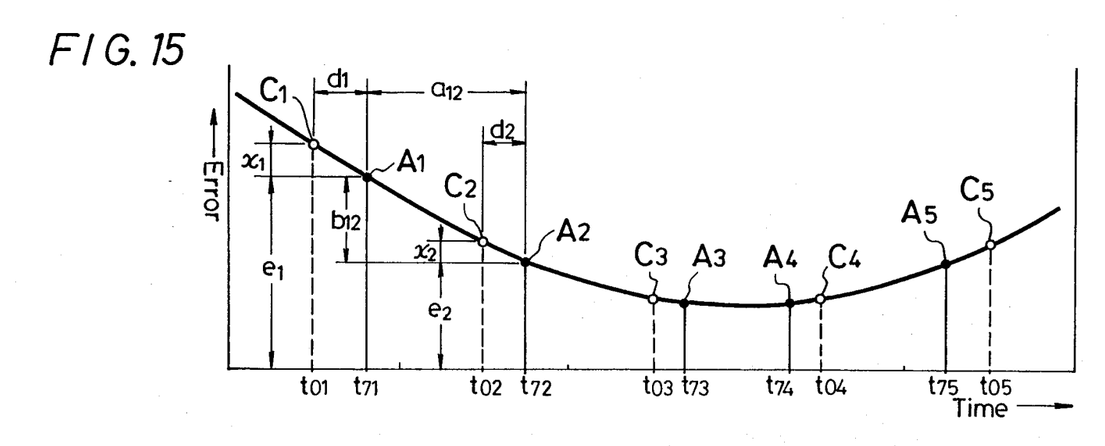
FIG. 15 is a plot showing the registration adjusting operation of the embodiment of FIG. 13.

The operation of the embodiment of FIG. 13 can be advantageously explained utilizing FIGS. 14 and 15. In FIG. 14 the effective image area is divided into the matrix of three rows and five columns to provide segmented image areas $2_{11}$ to $2_{35}$. The registration test chart for this segmented image area is formed as cross-stripes that comprise three horizontal stripes $5_1$ to $5_3$ and five vertical stripes $6_1$ through $6_5$. As will be described herein-below, the position of this test chart may be coarsely adjusted initially. The horizontal stripes $5_1$ to $5_3$ and the vertical stripes $6_1$ to $6_5$ do not pass through the centers $4_{ij}$ of the respective segmented areas $2_{11}$ to $2_{35}$. In addition, the length between the centers $4_{ij}$ of the segmented image areas $2_{11}$ to $2_{31}$ on the horizontal stripes $5_1$ to $5_3$ are not always equal and similarly the lengths between the respective centers $4_{ij}$ of the segmented image areas $2_{11}$ to $2_{15}$ on for example the first row and respective vertical stripes $6_1$ to $6_5$ are also not always equal. All that is generally required of this pattern of horizontal and vertical stripes of the test chart is that the vertical and horizontal stripes are generally formed parallel to the respective vertical and horizontal end edges of the image area.

In the embodiment of FIG. 13, address generators 112 and 114 count the clocks in synchronism with the vertical and horizontal scan operations to produce sequentially the position information in the vertical and horizontal directions relative to a point on the image area that is being scanned by the electronic beam of green image pick-up tube 11G. At the point where the electron beam scans the horizontal stripe $5_i$ in the arbitrarily selected segmented image area $2_{ij}$ of image area 1, the sampling pulse D corresponding to the position of the edge signal is supplied from edge detector 39 to latch circuit 116, which latches the positional data of the horizontal stripe $5_i$ that has been detected within the segmented image area $2_j$. Similarly, at the time when the electron beam scans the vertical stripe $6_j$ in the arbitrarily selected segmented image area $2_{ij}$, a sampling pulse corresponding to the position of the edge signal is fed from edge signal generating circuit 39 to latch circuit 116 that latches the positional data of the vertical stripe $6_j$ in the segmented image area $2_{ij}$.

CPU 51 produces the positional data of the intersection $7_{ij}$ of the striped patterns from the positional data of the horizontal stripe $5_i$ and the vertical stripe $6_j$ in the segmented image area $2_{ij}$. At the same time, the four channel registration error data at this intersecting point $7_{ij}$ are obtained as described herein-above. Then, during one field period, two kinds of data are obtained for all of the segmented image areas of the effective image area 1.

Accordingly, as seen in FIG. 15, data $A_1$ through $A_5$ of the horizontal registration errors of the intersections $7_{11}$ to $7_{15}$ of the stripes within the segmented image areas on a selected row, for example, $2_{11}$ to $2_{15}$ are measured and plotted, as represented by the solid circles in FIG. 15. Furthermore, the centers of the segmented image areas $2_{11}$ $2_{15}$ are located at $t_{01}$ through $t_{05}$, respectively. The horizontal registration data, $C_1$ through $C_5$, shown by the open circles in FIG. 15, at the centers of the respective segmented image areas are obtained as follows.

When the registration error data $C_2$ at the center of a segmented image area, for example, $2_{12}$, is calculated the positions $t_{71}$ and $t_{72}$ of the two measured data points $A_1$ and $A_2$ which are just ahead of and behind the data point $C_2$, are checked because their magnitudes $e_1$ and $e_2$ are already known and the position $t_0$ of the desired error data $C_2$ is already known so the difference $x_2$ between the magnitudes of the error data $C_2$ and $A_2$ can be expressed as follows:

$$x_2 = d_2 \cdot b_{12}/a_{12} \qquad (1)$$
$$= (e_1 - e_2)(t_{72} - t_{02})/(t_{72} - t_{71})$$

Furthermore, a difference $x_1$ between the magnitudes of the error data $C_1$ at the center of the segmented image area at one end of the row, for example, the segmented image area $2_{11}$ and the nearby measured data $A_1$ is calculated as follows:

$$x_1 = d_1 \cdot b_{12}/a_{12} \qquad (2)$$
$$= (e_1 - e_2)(t_{71} - t_{01})/(t_{72} - t_{71})$$

By carrying out the calculations above to accomplish the interpolation, or extrapolation, at every channel over the entire number of segmented image areas $2_{11}$ to $2_{35}$ of image area 1, the registration errors of the respective channels at the centers of the segmented image areas are calculated during one field period. Therefore, based on the calculated registration errors, the registration adjustment can be effected as described hereinabove using demultiplexer 60 and deflection circuit 20.

According to the embodiment of FIG. 13, if the optical image at the intersecting point of the cross-stripes of the registration test chart exists within each of the segmented image areas, then the registration error data at the centers of the respective segmented image areas can be obtained using the above calculations during a relatively short period of time. Therefore, the conditions necessary for aligning the positions of the registration test chart can be considerably reduced.

Although in the foregoing description the interpolation and extrapolation are effected by the straight line approximation expression, that is, a linear equation, such interpolation and extrapolation could also be effected by using a quadratic expression or a cubic expression.

Thus, in use of the inventive embodiment of FIG. 13 because the amount of the registration errors at the predetermined position of each segmented image area can be calculated from the position at which the registration error of the respective segmented image areas is detected and the amount of the detected registration error, it is possible to provide registration adjusting apparatus for a multi-tube color television camera that can alleviate the difficulties presently encountered when aligning the positions of the registration test chart.

The above description is given one a single preferred embodiment of the invention, but it will be apparent that many modifications and variations could be effected by one skilled in the art without departing from the spirit or scope of the novel concepts of the invention, which should be determined by the appended claims.

What is claimed is:

1. A multi-tube color television camera with an automatic registration adjusting system comprising:
   (a) first and second pick-up tubes for deriving respective first and second video signals corresponding to an image of a registration adjustment test chart;
   (b) deflection control means for controlling beam deflection of said first and second image pick-up tubes;
   (c) error sampling means for comparing said first and second video signals to produce registration errors and sampling said registration errors at points therein corresponding to an array of segmented areas of the image of said test chart;
   (d) deflection control data generating means for generating deflection control data supplied to said deflection control circuit in response to sampled registration errors from said error sampling means, so that the registration errors are sequentially varied in response to generated deflection control data;
   (e) polarity detecting means for detecting changes in polarity of the registration errors from said error sampling means for each of said segmented areas of the image;
   (f) memory means having a plurality of addresses corresponding to said segmented areas of the image for storing the deflection control data at each of said addresses when the registration error of the corresponding segmented area changes polarity;
   (g) control means for controlling the deflection control data when the registration errors of all segmented areas of the image change polarities; and
   (h) read out means for reading out deflection control data from said memory means and feeding deflection control data based on said read out data to said deflection control circuit.

2. A multi-tube color television camera with an automatic registration adjusting system according to claim 1, further comprising temporary memory means for temporarily storing the sampled registration errors from said error sampling means, and address generator means connected to receive a horizontal drive signal and a vertical drive signal of said television camera for generating therefrom address signals fed to said temporary memory means for determining addresses in said temporary memory means at which the sampled registration errors are stored, the output of said temporary memory being fed to said polarity detecting means.

3. A multi-tube color television camera with an automatic registration adjusting system according to claim 2, wherein reading and writing of said temporary memory means is controlled by said address signals and said address generator means also receives a clock signal of predetermined frequency for clocking said address signals in synchronism therewith.

4. A multi-tube color television camera with an automatic registration adjusting system according to claim 1, wherein said control means comprises a central processing unit connected to said memory means.

5. A multi-tube color television camera with an automatic registration adjusting system according to claim 4, further comprising address generator means connected to receive a vertical drive signal and a horizontal drive signal of said television camera and a clock signal of predetermined frequency for producing address signals fed to said central processing unit for reading and writing said deflection control data in said memory means.

6. A multi-tube color television camera with an automatic registration adjusting system according to claim 4, further comprising address generator means connected to receive a vertical drive signal and a horizontal drive signal of said television camera and a clock signal of predetermined frequency for producing address signals therefrom and a latch circuit receiving said address signals as positional data relative to said test chart, said positional data being fed to said central processing unit in correspondence with said registration error data, so that said central processing unit calculates the registration errors at the centers of said segmented image areas.

7. A multi-tube color television camera with an automatic registration adjusting system according to claim 6, wherein said central processing unit calculates the registration errors according to linear interpolation.

8. A method of registration adjustment for multi-tube color television camera comprising:
    (a) deriving respective first and second video signals corresponding to an image of a registration adjustment test chart from respective first and second pick-up tubes;
    (b) controlling beam deflection of said first and second image pick-up tubes;
    (c) comparing said first and second video signals to produce registration errors and sampling said registration errors at points therein corresponding to an array of segmented areas of the image of said test chart;
    (d) generating deflection control data supplied to said deflection control circuit in response to sampled registration errors from said error sampling, so that the registration errors are sequentially varied in response to generated deflection control data;
    (e) detecting changes in polarity of the registration errors from said error sampling for each of said segmented areas of the image;
    (f) storing the deflection control data in a memory having a plurality of addresses corresponding to said segmented areas of the image at each of said addresses when the registration error of the corresponding segmented area changes polarity;
    (g) controlling the deflection control data when the registration errors of all segmented areas of the image change polarities; and
    (h) for reading out deflection control data from said memory and feeding deflection control data based on said read out data for controlling said beam deflection.

9. A method of registration adjustment according to claim 8, further comprising temporarily storing the sampled registration errors from said error sampling means in a temporary memory, and generating address signals from a horizontal drive signal and a vertical drive signal of said television camera, said address signals determining addresses in said temporary memory at which the sampled registration errors are stored, the output of said temporary memory being used in detecting changes in polarity.

10. A method of registration adjustment according to claim 9, wherein reading and writing of said temporary memory is controlled by said address signals and said addresses are generated using a clock signal of predetermined frequency for clocking said address signals in synchronism therewith.

11. A method of registration adjustment according to claim 9, further comprising generating address signals from a vertical drive signal and a horizontal drive signal of said television camera and a clock signal of predetermined frequency for producing address signals therefrom and latching said address signals in a latch as positional data relative to said test chart, said positional data being fed to a central processing unit in correspondence with said registration error data, so that said central processing unit calculates the registration errors at the centers of said segmented image areas.

12. A method of registration adjustment according to claim 11, wherein said central processing unit calculates the registration errors using the step of linear interpolation.

* * * * *